(12) United States Patent
Schumacher

(10) Patent No.: US 7,865,499 B2
(45) Date of Patent: Jan. 4, 2011

(54) SYSTEM AND METHOD FOR MANAGING INFORMATION FOR A PLURALITY OF COMPUTER SYSTEMS IN A DISTRIBUTED NETWORK

(75) Inventor: Michael K. Schumacher, Waterford, MI (US)

(73) Assignee: Lakeside Software, Inc., Bloomfield Hills, MI (US)

( * ) Notice: Subject to any disclaimer, the term of this patent is extended or adjusted under 35 U.S.C. 154(b) by 890 days.

(21) Appl. No.: 11/268,012

(22) Filed: Nov. 7, 2005

(65) Prior Publication Data

US 2006/0089946 A1  Apr. 27, 2006

Related U.S. Application Data

(63) Continuation-in-part of application No. 10/047,866, filed on Jan. 15, 2002, now Pat. No. 6,978,265.

(60) Provisional application No. 60/262,134, filed on Jan. 16, 2001.

(51) Int. Cl.
*G06F 7/00* (2006.01)
(52) U.S. Cl. .................................. 707/711; 707/741
(58) Field of Classification Search .................. None
See application file for complete search history.

(56) References Cited

U.S. PATENT DOCUMENTS

| | | | |
|---|---|---|---|
| 5,630,125 A | 5/1997 | Zellweger | |
| 5,647,058 A * | 7/1997 | Agrawal et al. | 707/1 |
| 5,905,988 A | 5/1999 | Schwartz | |
| 5,958,012 A | 9/1999 | Battat et al. | |
| 5,961,594 A | 10/1999 | Bouvier et al. | |
| 5,987,454 A * | 11/1999 | Hobbs | 707/4 |
| 5,996,012 A | 11/1999 | Jarriel | |
| 6,061,675 A | 5/2000 | Wical | |
| 6,154,213 A | 11/2000 | Rennison et al. | |
| 6,175,832 B1 | 1/2001 | Luzzi et al. | |

(Continued)

OTHER PUBLICATIONS

Support Aide Brochure, Lakeside Software, Inc. 2000.

(Continued)

*Primary Examiner*—Charles Rones
*Assistant Examiner*—Belix M Ortiz
(74) *Attorney, Agent, or Firm*—Dykema Gossett PLLC

(57) ABSTRACT

A system for managing computers in a distributed computer network includes a collection agent for each computer being monitored, a local database coupled to each collection agent, one or more condensing agents coupled to the databases, and at least one console module. The condensing agent generates an index table from a source database and sends it upstream to the next level up in the hierarchy of databases. Other condensing agents may in turn act on this index table and send it up to a still further level, until a top-level master node has an index table reflecting the entire network. The console can use the index table to identify what databases contain needed data, and then make only selective connections to databases to answer queries, avoiding connections to all the local databases. The condensing agent also produces summarized data and sends it upstream as well, to be used by the console. Efficiency is improved over conventional systems. Use of the index method and the summary method can be transparent to (hid from) the use of the console, or may be made visible, with selection options.

31 Claims, 8 Drawing Sheets

U.S. PATENT DOCUMENTS

| | | |
|---|---|---|
| 6,263,433 B1 | 7/2001 | Robinson et al. |
| 6,282,712 B1 | 8/2001 | Davis et al. |
| 6,381,556 B1 * | 4/2002 | Kazemi et al. ............... 702/182 |
| 6,396,913 B1 * | 5/2002 | Perkins, III ............ 379/112.01 |
| 2002/0055932 A1 * | 5/2002 | Wheeler et al. .......... 707/104.1 |
| 2002/0099690 A1 | 7/2002 | Schumacher |
| 2003/0069893 A1 * | 4/2003 | Kanai et al. .............. 707/104.1 |

OTHER PUBLICATIONS

Microsoft Systems Management Server 2.0 Data Sheet, Microsoft Corporation, Sep. 10, 1999.

Introduction to Windows 2000 Management Services, Microsoft Corporation, 2000.

* cited by examiner

| L1 | L2 | L3 | ... | L16 | CONN_STR | RECTYPE | NAME1 | NAME2 |
|---|---|---|---|---|---|---|---|---|
| CHRISTINE | | | | | LPISLMLLHUHUG | 2 | CHRISTINE | ServerNT |
| CHRISTINE | | | | | LPISLMLLHUHUG | 5 | LSI | Administrator |
| CHRISTINE | | | | | LPISLMLLHUHUG | 3 | 68 | |
| CHRISTINE | | | | | LPISLMLLHUHUG | 3 | 67 | |
| CHRISTINE | | | | | LPISLMLLHUHUG | 4 | 3Com EtherLink PCI | |
| CHRISTINE | | | | | LPISLMLLHUHUG | 5 | CHRISTINE | SYSTEM |
| DB_DEAN | | | | | LOIGNPLUGQGP | 1 | | |
| DB_DEAN | DEAN | | | | LOINKNLKGRGT | 2 | DEAN | WinNT |
| DB_DEAN | DEAN | | | | LOINKNLKGRGT | 5 | DEAN | SYSTEM |
| DB_DEAN | DEAN | | | | LOINKNLKGRGT | 5 | LSI | dean |
| DB_DEAN | DEAN | | | | LOINKNLKGRGT | 3 | 67 | |
| DB_DEAN | DEAN | | | | LOINKNLKGRGT | 4 | FE575 Ethernet Adapter | |
| DB_KEN | | | | | LUIMNRLNGOGK | 1 | | |
| DB_KEN | KEN | | | | LUIMNRLNGOGK | 2 | KEN | WinNT |
| DB_KEN | KEN | | | | LUIMNRLNGOGK | 2 | KEN | SYSTEM |
| DB_KEN | KEN | | | | LUIMNRLNGOGK | 3 | 67 | |
| DB_KEN | KEN | | | | LUIMNRLNGOGK | 4 | 3Com 3c90x Ethernet Adapter | |
| DB_KEN | DB_CARRIE | | | | LOIGNPLPGUHQ | 1 | | |
| DB_KEN | DB_CARRIE | CARRIE | | | LVJJLKKOGMGTG | 2 | CARRIE | WinNT |
| DB_KEN | DB_CARRIE | CARRIE | | | LVJJLKKOGMGTG | 2 | CARRIE | SYSTEM |
| DB_KEN | DB_CARRIE | CARRIE | | | LVJJLKKOGMGTG | 3 | 67 | |
| DB_KEN | DB_CARRIE | CARRIE | | | LVJJLKKOGMGTG | 4 | FE575 Ethernet Adapter | |
| DB_KEN | DB_CARRIE | CARRIE | | | LVJJLKKOGMGTG | 5 | LSI | Carrie |
| DB_KEN | DB_MIKESWME | | | | LOIGNPLNGMGJ | 1 | | |
| DB_KEN | DB_MIKESWME | MIKESWME | | | LHIRKTLVHSHVG | 2 | MIKESWME | WinNT |
| DB_KEN | DB_MIKESWME | MIKESWME | | | LHIRKTLVHSHVG | 2 | MIKESWME | SYSTEM |
| DB_KEN | DB_MIKESWME | MIKESWME | | | LHIRKTLVHSHVG | 5 | LSI | mikes |
| DB_KEN | DB_MIKESWME | MIKESWME | | | LHIRKTLVHSHVG | 5 | MIKESWME | NETWORK SERVICE |
| DB_KEN | DB_MIKESWME | MIKESWME | | | LHIRKTLVHSHVG | 3 | 67 | |
| DB_KEN | DB_MIKESWME | MIKESWME | | | LHIRKTLVHSHVG | 4 | Intel 8255x-based PCI Ethrnet Adapter [10_100] | |
| DB_KEN | DB_MIKESWME | MIKESWME | | | LHIRKTLVHSHVG | 5 | MIKESWME | LOCAL SERVICE |
| DB_KEN | DB_MARTINA | | | | LUIMNRLHGSHO | 1 | | |
| DB_KEN | DB_MARTINA | MARTINA | | | LNILLMKOGKGK | 2 | MARTINA | WinNT |

SYSTEM AND METHOD FOR MANAGING INFORMATION FOR A PLURALITY OF COMPUTER SYSTEMS IN A DISTRIBUTED NETWORK

RELATED APPLICATIONS

This application is a continuation-in-part (CIP) of U.S. application Ser. No. 10/047,866 filed Jan. 15, 2002, now U.S. Pat. No. 6,978,265, which in turn claims the benefit of U.S. provisional application, Ser. No. 60/262,134, filed Jan. 16, 2001, both disclosures of which are hereby incorporated herein by reference in their entireties.

BACKGROUND OF THE INVENTION

1. Technical Field

The present invention relates generally to computing systems and, more particularly to a system and method for managing a plurality of computers in a distributed computing network.

2. Discussion of the Related Art

It is known to provide a distributed computing network in which server computers and workstation computers are organized in a hierarchical manner. In this regard, it is also known to segregate the network into multiple domains, for example, each controlled by a Primary Domain Controller (PDC) provided as a network server, which may handle user logins, rights, and the like. Administrators of such large distributed networks desire the ability to manage all of its constituent computer systems by way of a single, unified console. Such administrators further desire the ability to "drill down" to view details related to individual systems, yet have the ability to see the "big picture" through analysis of the behavior of groups of systems. The existing art has provided a number of different management systems that can, in general terms, satisfy the foregoing. However, such systems have various shortcomings.

One general group of conventional management systems are referred to as "point management" systems. In one implementation of point management systems, a centralized database model is used wherein agents collecting data on the monitored systems forward the collected data up to the centralized database. However, such an implementation presents inherent limitations in terms of scalability. Specifically, taken to its logical conclusion, the implementation results in an extremely large database, which wastes resources and unreasonably extends query times on the database. These characteristics are undesirable, and may be unacceptable in many circumstances. In addition, the process of forwarding collected data over the distributed network results in extremely high network traffic, which is also undesirable for a management system as it denies the users of the network access to the bandwidth, and, in any event, results in slow response times for the management system itself.

Another implementation taken by "point" management systems involves direct connectivity with the agents that collect data on the monitored computer systems. However, this implementation also has limitations inasmuch as the effectiveness of the management console is strictly dependent on the connectivity capabilities to the monitored systems. For example, computer systems that are "off" or "disconnected" are inaccessible. Additionally, the direct connectivity model also exhibits extremely high network traffic.

Another approach taken in the art for management systems that can manage a large number of computers are referred to as "framework systems." Framework systems conventionally require that a management console maintain direct connectivity with the agents that collect data on the monitored systems, as described above in regard to the "point" management systems. Such "framework" systems are also known to retrieve or "pull" data from all the monitored systems and store the same in a centralized database. Another implementation of conventional "framework" system employs a so-called "directory" approach. The "directory" approach is where each of the monitored systems maintains its own individual database, which is accessed by the console when information concerning the monitored system is desired. Conventional "framework" systems thus have the same shortcomings as the "point" management systems, namely, either a centralized "pull" model which leads to large databases, long query times, and high network traffic, or, depends highly on direct connectivity with the monitored systems across the distributed network.

There is therefore a need for an improved system and method for managing a plurality of computers in a distributed network that minimizes or eliminates one or more of the shortcomings as set forth above.

SUMMARY OF THE INVENTION

One object of the present invention is to solve one or more of the shortcomings set forth above in the Background. Another object of the present invention is to provide a more efficient method of managing a plurality of computers over a distributed network. These and other objects are realized through a system and method of managing a plurality of computers in a distributed network. The invention allows a large number of computer systems to be managed as a whole from one or more console locations, while allowing "drill-down" capabilities to individual systems. The invention also provides a unified view of the distributed network, all while requiring very little network bandwidth.

In one aspect of the invention, a method is provided for managing a plurality of computers accessible over a distributed network and involves four basic steps. First, collecting original data relating to each computer and storing the original data in respective storage databases. Next, generating an index table including index data for each computer wherein the index data is configured to (i) identify the contents of the original data and (ii) facilitate access to storage databases over the distributed network. The third step involves scanning at least one of the index tables to select which ones of the plurality of storage databases contain the original data that could be used to answer a user query. In one embodiment, the storage databases are arranged in a tree style hierarchy wherein each database in the hierarchy contains respective index data regarding databases below it in the tree. The final step involves accessing the selected storage databases to retrieve the original data and generate an output therefrom.

In a preferred embodiment, the accessing step is performed via a console module, executing at a top-level node in the hierarchy. Maintaining the index data at each database in the hierarchy allows the console module to connect to databases at any point in the hierarchy, without having to connect to all of the databases, which preserves efficiency and overcomes the limitations of conventional systems.

In a still further preferred embodiment, the index data is produced by a condensing agent, acting on the original data in a first database with which it is associated. The index data is then sent upstream in the hierarchy to a second database immediately above it in the tree. The condensing agent at the next level up may in turn act on both the original data in the second database as well as the index data received from the level below. The newly formed index data is sent further upstream, and so on, until the top-level node is reached. This mechanism is how the index data, at any particular level in the hierarchy, reflects all the computers below it in the hierarchy.

In a further aspect of the invention, the method includes the further step of producing summarized data for each computer. The summarized data includes records containing summarized information indicative of, for example only, application program usage, for various groups of systems from the databases logically below it in the hierarchy. The step of producing the summarized data may include, in a preferred embodiment, the substep of summarizing respective application program usage data from application tables that are lower in the hierarchy, and passing the summarized information upstream to an application table higher in the hierarchy. Summarized data may be produced through use of collected, original data in combination with processed data created by the application of various mathematical aggregation functions on the original data as well as other means. Summarizing data and passing such data upstream provides the console module with the novel capability of simply connecting to one summarized data table. This allows efficient resolution of many user queries without having to drill down to (i.e., connect to) a large number of monitored systems to retrieve the original data.

An apparatus corresponding to the method is also presented.

Methods of providing improved distributed computer system management while one or more computer systems are disconnected from the network are also presented.

A method of distributed processing to achieve near optimal performance for complex queries is also presented.

BRIEF DESCRIPTION OF THE DRAWINGS

FIG. 7 is a simplified block diagram showing, in greater detail, the index table of FIG. 2 for a top-level master node in the hierarchy.

DETAILED DESCRIPTION OF THE PREFERRED EMBODIMENT

Figure 1:
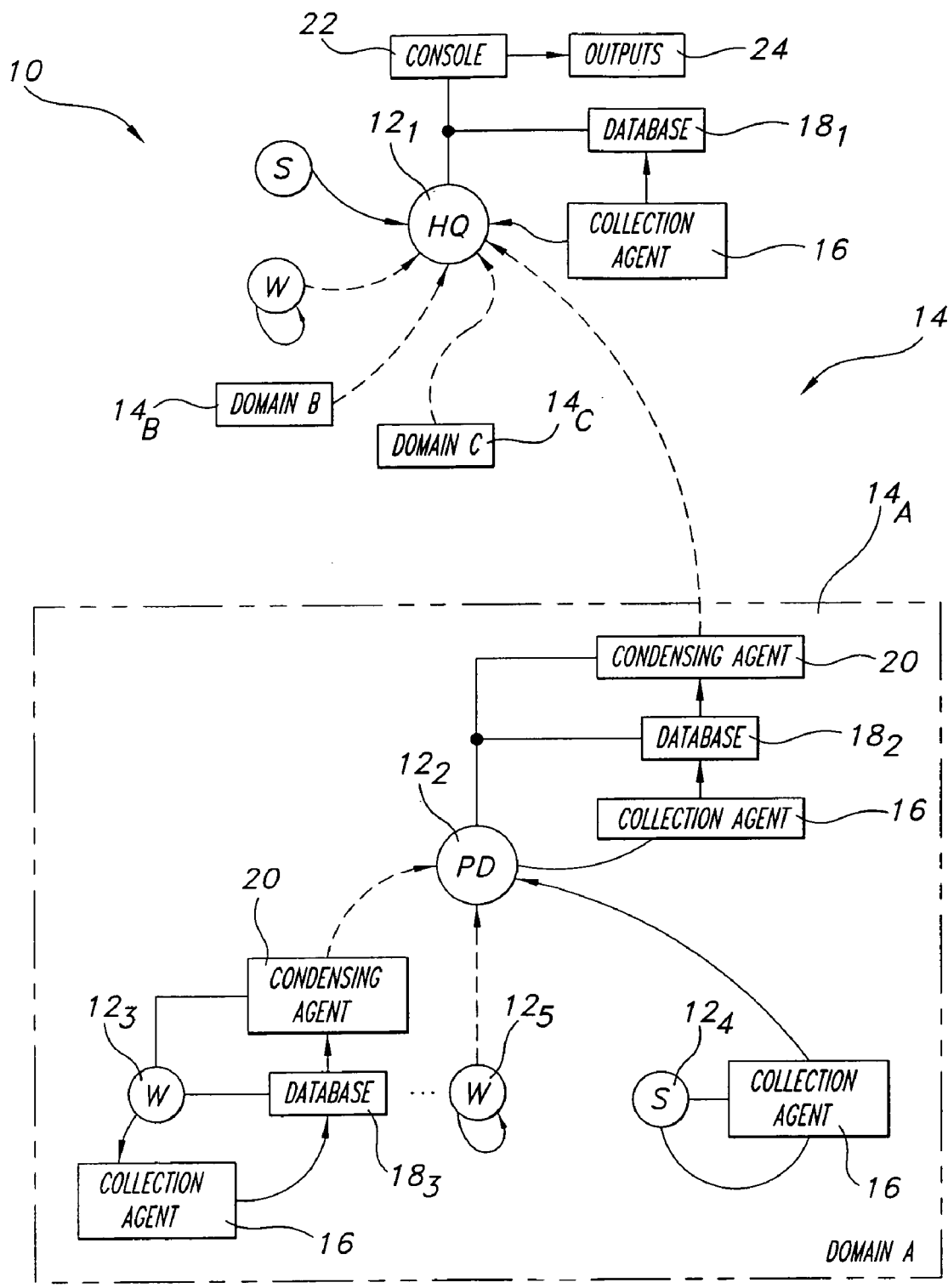
FIG. 1 is a simplified block diagram view of a distributed computing network according to the invention.

Referring now to the drawings wherein like reference numerals are used to identify identical components in the various views, FIG. 1 shows an apparatus 10 for managing a plurality of computers which are designated $12_1, 12_2, \ldots 12_n$, deployed in a distributed network 14. Distributed network 14 may include one or more domains, such as Domain A, designated $14_A$, Domain B, designated $14_B$, and Domain C, designated $14_C$. Computers $12_1, 12_2, \ldots 12_n$ may comprise conventional server computers and workstation computers. As illustrated in FIG. 1, computers $12_1, 12_2, \ldots 12_n$ may be arranged in an hierarchical relationship, wherein computer $12_1$ may be a top-level master node (e.g., at a headquarters location), computer $12_2$ may be a primary database (PD) for Domain A (a parent node from which one or more branches extend), and computers $12_3, 12_4$, and $12_5$ may be a workstation computer ("W"), a server computer ("S"), and another workstation computer, respectively. Although a tree-style hierarchical arrangement is shown in FIG. 1, the present invention is not so limited, and may be applied to other topologies (e.g., ring, star, etc.). FIG. 1 also shows a plurality of collection agents 16, a corresponding plurality of databases $18_1, 18_2$, and $18_3$, a plurality of a condensing agents 20, a console module 22, and an output block 24.

Computer systems 12 may comprise any conventional computing apparatus, and, in one embodiment, may comprise a Windows-based computer. It should be understood, however, that the present invention is not so limited. Computers 12 may be based on other widely available operating systems, such as, but not limited to, Unix-based systems, Linux-based systems, and Apple Macintosh-based systems.

Before proceeding to a detailed description of the present invention, it bears emphasizing that conventional management systems, as described in the Background, either "pull" all the information from and throughout the distributed network into a centralized database, or, alternatively, provide a multitude of individual databases, one for each monitored system, and to which a central console stays connected for information. These systems have the disadvantages of having either a large central database, and thus very slow query times, or, rely on ongoing connectivity throughout the distributed network. Both these systems experience the shortcoming of high network traffic.

The present invention, as seen by the user of console 22, appears to be a single, large database containing information on the monitored computers 12. However, the invention in actuality comprises a plurality of databases, preferably arranged in a hierarchy with a plurality of levels, although other organizations are possible. Each of the databases in the hierarchy contains index data reflecting the computers (and subsystems and users thereof) below it in the tree, as well as summarized information that statistically represents groups of systems, drawn from the databases below it in the tree. In a first mode of operation, a console module may connect to one database at a certain level in the hierarchy to use the summary information to answer queries about the computer systems below it, without having to connect to a potentially large number of databases. For example, where the query would otherwise be too inefficient because it would have to connect to a large percentage of the databases (e.g., who uses Microsoft Word?). In a second mode, the console uses index data to locate which databases in the hierarchy contain relevant information, and then further uses connection information in the index data to connect to only those databases to answer a query (to preserve efficiency, namely, to reduce database size and network traffic).

With continued reference to FIG. 1, data collection agent 16 is configured to acquire and store original data in the database 18 that is associated with it. Collection agent 16, in one embodiment, is configured to collect information about systems, disks, network interfaces, application programs and usage thereof, and users on the computer system 12 on which the agent has been deployed. The original data is collected by collection agent 16 using a variety of mechanisms and techniques that are well known to those of ordinary skill in the art. It should be understood that original data, as used herein, means both that data which is measured, sensed or detected directly in addition to data that may be derived from such measured, sensed or detected data. The main point of distinction is between condensed data (i.e., index data and summary data) and uncondensed data (i.e., original data).

In another embodiment, multiple data collection agents 16 may be coupled to a single database 18. In such an embodiment, however, one condensing agent preferably condenses data up to the next level, although each agent could condense its own data to the next higher level in another embodiment.

Any of databases 18 (there are multiple databases 18 shown in FIG. 1, namely $18_1$, $18_2$, $18_3$) may be of a local desktop database type, for example a Microsoft Jet (Access compatible) type database, or may be a client server database (e.g., a Microsoft SQL server, an Oracle database, an IBM DB2 database, or a Sybase Enterprise server). In alternate embodiment, however, database 18 may comprise any mechanism or structure for storing or maintaining information, such as a flat file, in an agent on the computer, or in any other type of memory (i.e., RAM, ROM). Data collection agent 16 may be configured to maintain a continuous connection with its associated database 18 in order to save system, application usage and user information frequently (real-time). Each database 18 will then be a "source" database for a condensing agent 20, described below.

It should be understood that either a remote client-server database or a local database may be used to store the collected, original data. A remote database typically requires less overhead on the client (monitored computer 12), and is generally smaller and faster, but results in higher network bandwidth utilization. A local database greatly reduces the total space requirements on the client-server database by keeping the bulk of the collected data for a system stored on that system's local hard drive, is typically simpler to set up, and results in much less network bandwidth utilization.

It should be further understood that one factor in the decision as to which type of database to use depends primarily on whether the user of the apparatus 10 contemplates a need to analyze original data for a computer system 12 while it is off-line. Since the computer system 12's local hard drive is unavailable when the system is off-line, selecting a local Microsoft Jet database means that access to the local collection database 18 while be unavailable, e.g., for analysis purposes, while it is down. In contrast, if the computer system 12 is configured to save original data into a client-server database (not located on the same system), the original data stored in such a collection database will be available for analysis even if the computer system is unavailable (e.g., is powered down, or is a laptop and is disconnected from the network).

Moreover, data collection agent 16 as deployed on a laptop or other portable computer system 12 may advantageously configured to store original data into a local collection database 18 (e.g., Microsoft Jet). For example, when a user of such a computer system 12 unplugs or otherwise disconnects from the network, original data can still be collected while the laptop is disconnected from the network since the collection database 18 is local to and disposed on the laptop (computer system 12). When the user reconnects his laptop (computer system 12) to the network, the original data that was collected when the laptop (computer system 12) was disconnected from the network will be condensed to the next level automatically, assuming that the condensing agent 20 is installed on the laptop. Analysis of this original data at higher level in the tree will not miss any data when the laptop was disconnected. Further description of the condensing agent and analysis features will be set forth below.

The original data acquired by collection agent 16 may include CPU usage information, such as average overall CPU utilization, minimum and maximum CPU utilization, utilization in a Kernel mode and in a user mode, respectively. The original data may further include information relating to memory usage, for example, average, minimum, and maximum memory usage for a working set while active, a nominal working set, a peak working set, a peak paged pool, peak non-paged pool, peak page file usage and page faults/second. It should be understood that in addition to the foregoing directly measured information, collection agent 16 may produce and store derived data, such as standard deviation and variance of any of the foregoing monitored parameters. The original data may further include application usage information, such as the name of an application program (i.e., the name of the executable), a count of the number of times the application was run, a start time when the application was loaded and a stop time when the application was terminated, a duration in which the application ran, which may be calculated using the start and stop times or may be separately tracked and recorded, the last time an application was used, and the like. Collection agent 16 may further acquire and store information concerning disk usage and network usage, as well as various system operating parameters. It should be understood that the foregoing is exemplary only, and not limiting in nature.

Condensing agent 20 is configured to condense the original data (as well as perhaps summarized data and index data from lower levels) from a "source" database and to save (i) index data (to be described in greater detail below) and (ii) summarized data (also to be described in greater detail below) into a destination database. The "destination" database, in the preferred embodiment, is a database 18 that is logically higher in the hierarchy of databases than the source database. For purposes of illustration, and with respect to FIG. 1, workstation computer $12_3$ has deployed thereon a data collection agent 16, which acquires and stores original data in database $18_3$. Condensing agent 20 is connected to database $18_3$ and condenses and supplies the summarized data, as well as the index data, upstream to the destination database $18_2$, which is logically higher in the hierarchy of databases. However, the condensing agent 20 coupled to database $18_2$, may operate on both (i) the original data for computer $12_2$, as well as (ii) the index data and summarized data from computers $12_3$, $12_4$ and $12_5$. As shown in FIG. 1, original data flows are shown in solid-line format, while condensed data (index and summary) flows are shown in dashed-line format.

The terms index data and summarized data will now be described. The index data produced by condensing agent 20 identifies the content contained in the "source" database, and associates therewith information sufficient to facilitate access to that source database over the distributed network 14. The access or connection data is provided so that console 22 can retrieve the content. The index data may be used by console 22, or, depending on the depth of the hierarchy, another condensing agent 20 where its "source" database is the "destination" database of the condensing agent 20 immediately downstream.

The summarized data produced by condensing agent 20 is in the nature of summarized information drawn from the original data in the "source" database. For example, this data may relate to application program usage, disk usage, network usage, and system operation information. As mentioned above, the summarized data may also itself incorporate or aggregate summarized data from lower levels in the hierarchy. This feature will be explained in greater detail below, with reference to specific examples.

Condensing agent 20 is configured to perform these activities (i.e., examine the original data collected in its "source" database 18) on a predetermined, periodic basis, not necessarily continuous, like the activities of the collection agent 16. The rate at which the condensing operation is performed may be varied through configuration.

As shown in FIG. 1, console module 22 is coupled to a base or primary database 18, shown as database $18_1$. While the console 22 is shown deployed on the top-level, master node, this is not required for the present invention. Multiple console modules 22 may be deployed in the network 14; however, the information that the console module 22 has available to it will depend on the database 18 to which it is connected, specifically where in the hierarchy such database is located. In general, a database 18 only contains information about the computer system with which it is associated and of computer systems below it in the tree hierarchy. The top-level master node 12, has complete information about all the monitored computers 12 in the distributed network 14 since it sits on the very top. However, database $18_2$ only has information about computers $12_2$, $12_3$, $12_4$ and $12_5$ (i.e., domain A), and not any information about domain B or domain C, since these portions of the distributed network are not below it in the relevant branch of the tree (although they may be considered at the same "level" with respect to top-level master node).

Figure 2:
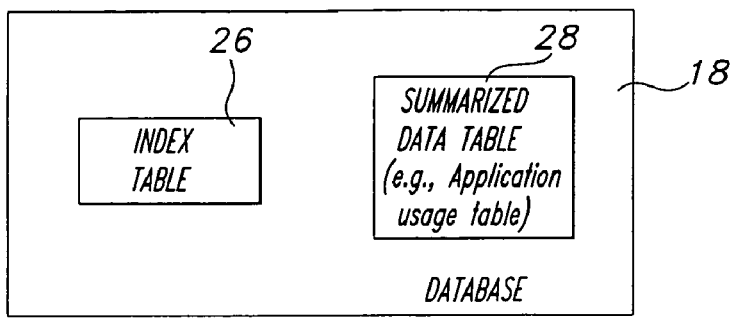
FIG. 2 is a simplified block diagram showing, in greater detail, one of the databases shown in FIG. 1.

FIG. 2 shows database 18 in greater detail. Each database 18 includes (i) an index table 26 that includes index data and (ii) a summarized data table 28, which contains summarized data. It should be understood that at each level in the hierarchy, the condensing agent 20 is operative to pass index data, and summarized data upstream to the next database in the hierarchy. Index data, as well as summarized data, flows from all of the "leaf" or end nodes all the way up to the top-level master node. Thus, the "base" or "primary" database (database $18_1$) in the collection of databases, contains index data and summarized data with respect to all of the monitored computers 12 in the distributed network 14 below it.

Figure 3:
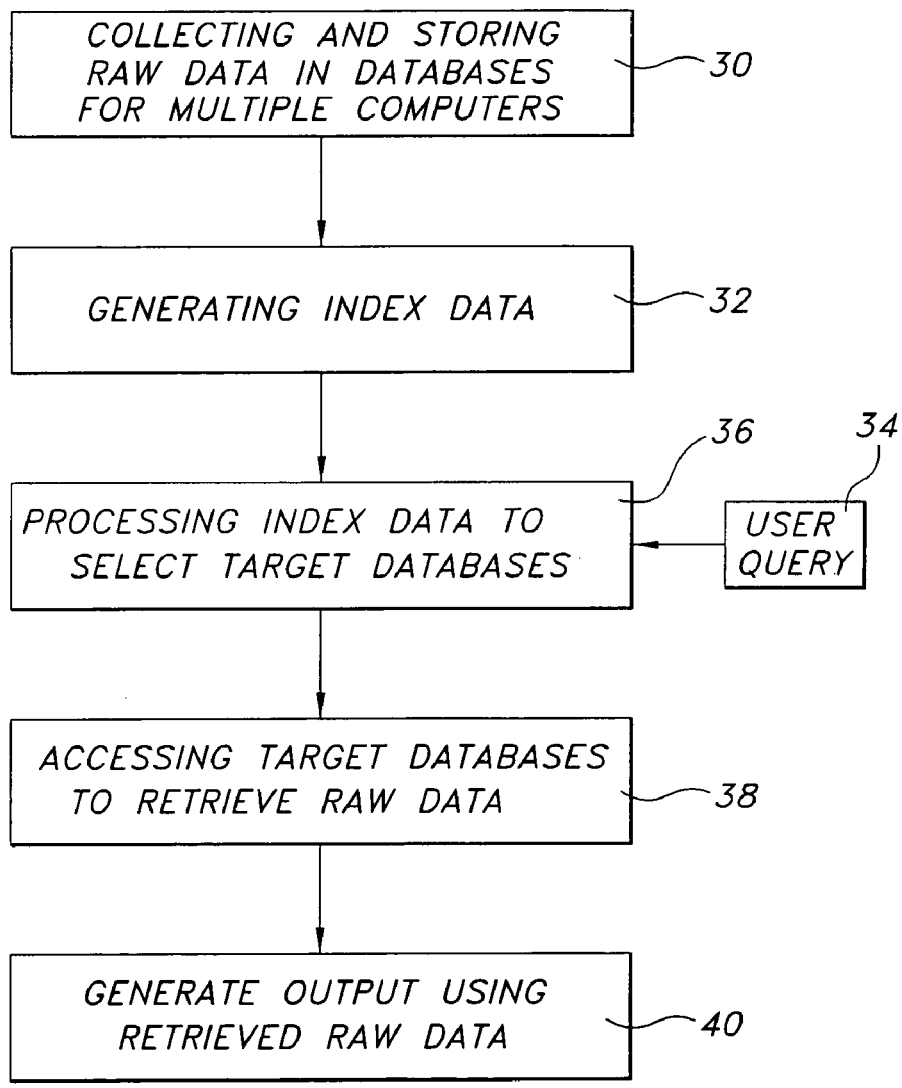
FIG. 3 is a flow chart diagram illustrating a method of using index data according to the invention.

With this in mind, reference is now made to FIG. 3. FIG. 3 shows a method for using the index data to efficiently retrieve information needed to satisfy a user query. The method starts in step 30.

In step 30, the collection agent 16 for each computer acquires and stores original data in a respective database associated with the monitored computer 12. The method then proceeds to step 32.

In step 32, the multiple condensing agents 20 at each level of the tree generate a respective index table including index data for each computer. It should be understood that the index data is generated using both (i) the original data in the database pertaining to the monitored system, and (ii) any previously forwarded index data from lower levels. This process is repeated so that the database 18 associated with the top-level master node in the hierarchy includes the index data for all of the monitored computers 12 in the distributed network 14. The method then proceeds to step 34.

In step 34, a user defines a query, which may contain a variety of search parameters. The search parameter information is passed to step 36.

In step 36, console module 22 is activated to process the index data in the base database (to which it is connected) in order to select target databases that contain information needed to answer the user query. Console module 22, in this processing step, uses the index information from the base database to locate the information in the collection of databases that are logically lower in the hierarchy. The index data is configured and is used so that complex user queries for contents can be answered without the need to connect to all of the databases in the hierarchy (i.e., to determine their contents), as is conventional for directory-style "framework" management systems. For example, a user query that requests a list of applications a user has executed on any system in the distributed network 14 can be efficiently answered by using the index data to locate a short list of target databases in the hierarchy that contain the relevant information regarding the user, and then connecting to only those databases 18 to answer the query. The index data according to the invention is a feature to accomplish efficient navigation of the collection of databases. The method then proceeds to step 38.

In step 38, the console module 22 is configured to access the target databases in order to retrieve the information needed to answer the user query. In this regard, as described above, the index data contains information configured to facilitate access to the databases over the distributed network. In one embodiment, this information comprises connection information sufficient to access the target database over a network. The method then proceeds to step 40.

In step 40, console module 22 uses the retrieved data to generate an output responsive to the user query. This output, shown in FIG. 1 as output 24, may comprise a formatted screen display or, alternatively, a printed report. Other output forms other than the foregoing are possible, such other outputs being adapted to satisfy the needs of a particular user. In a preferred embodiment, post processing steps may be performed before the output is formatted for display.

Figure 4:
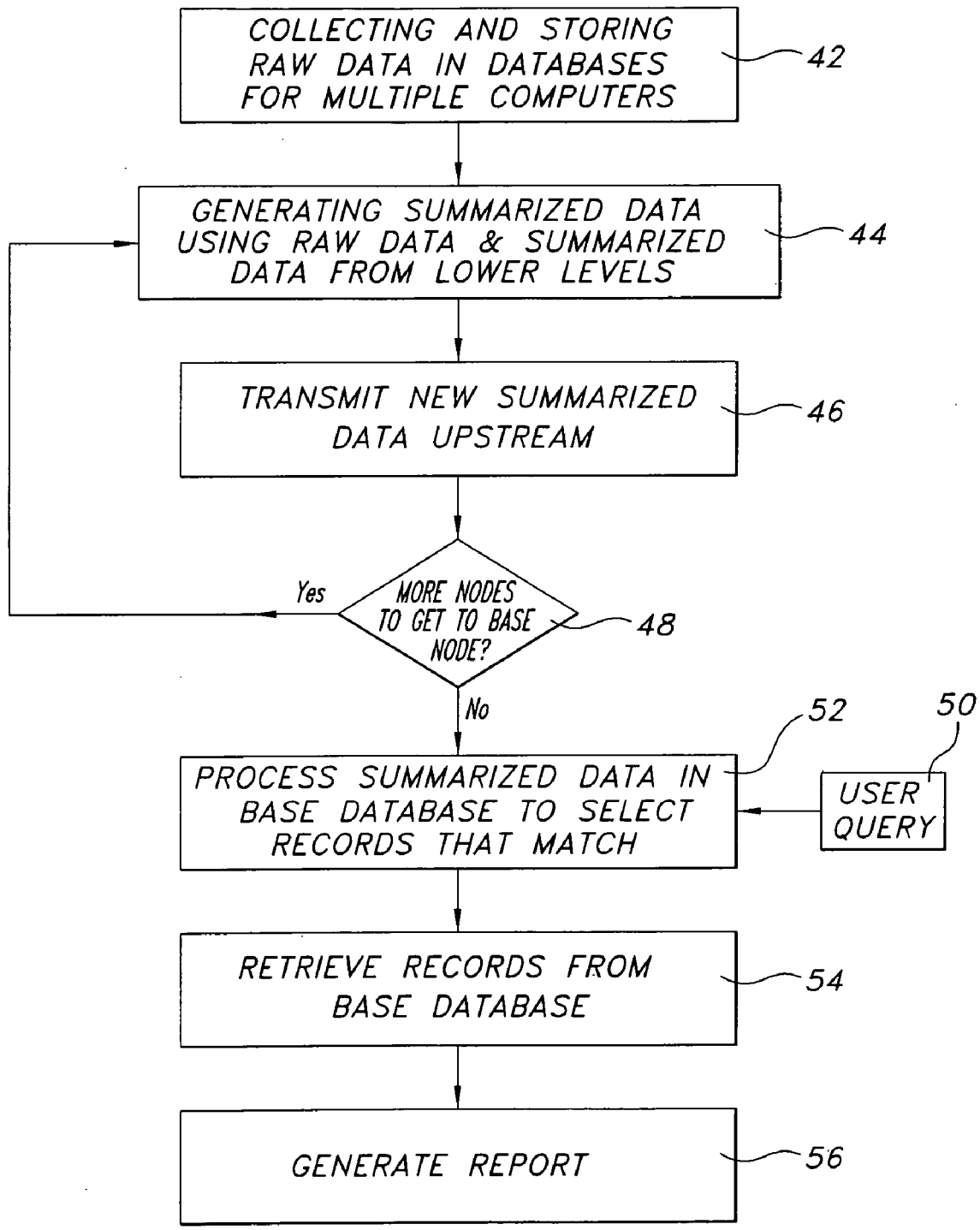
FIG. 4 is a flow chart diagram illustrating a method of using summarized data according to the invention.

FIG. 4 is a flow chart diagram showing another aspect of the present invention relating to "summarized" data. The method begins in step 42.

In step 42, the data collection agent 16 associated with each computer acquires and stores original data in respective databases associated with the computer 12 being monitored. The method then proceeds to step 44.

In step 44, the condensing agent 20, at each level, and for each computer 12 in the distributed network that has been configured with collection agent 16 and condensing agent 20, generates summarized data using (i) original data from the database 18 associated with the monitored system and (ii) summarized data from logically lower levels in the hierarchy (if any). The method then proceeds to step 46.

In step 46, the condensing agent 20 transmits the new summarized data upstream to the destination database, located logically higher in the hierarchy of databases. The method then proceeds to step 48.

In step 48, the question is whether the process of condensing has proceeded far enough up the tree to reach the top-level master node. Decision block 48, it should be understood, is not performed necessarily by any one particular condensing agent, but rather is included in FIG. 4 to illustrate the logic of how the entire hierarchy of databases is condensed and information is passed, level by level, upwards. It should be understood that the flowchart is not intended to suggest that processing occur only at the lowest level first, then to proceed upward in the tree. Indeed, the condensing agents may operate asynchronously. Ultimately, the top level computer, which executes console module 22, has access, via its "base" database, to summarized information for all the monitored computer systems in the entire distributed network 14. If there is further condensing to be done, then the method branches back to step 44. However, if the entire hierarchy of databases has been condensed, then the method proceeds to step 50 and 52.

In step 50, a user formulates a query wherein certain search parameters are defined, and which is passed to-step 52.

In step 52, console-module 22 processes the summarized data in the base database 18 and selects records, for example, found in a summarized data table in the base database, that satisfies the user query. In accordance with the invention, there is no need for console module 22 to make connections throughout the distributed network 14 in order to answer the query. All of the necessary information may be found in the summarized data contained in the base database 18. For example, some queries posed might, by their nature, require connections to a very large number of databases (i.e., expressed as a percentage or in absolute terms). For example, a user query that requests a list of all users of a commonly used application (e.g., Microsoft Word word processor) might require access to nearly every database 18 in the hierarchy of databases. In order to avoid such queries, condensing agent 20 stores summary information upwards in the tree that aggregates certain kinds of data by group, system, and/or user or combination thereof. Queries that would otherwise be too inefficient to process and answer in a large enterprise can be easily answered according to the invention using summarized data records that are "moved up" in the hierarchy. This feature of the invention will be described in greater detail below with reference to specific examples. The method then proceeds to step 54.

In step 54, console module 22 retrieves the records containing summarized data from the base database. The method then proceeds to step 56.

In step 56, console module 22 generates an output report, designated as output 24 in FIG. 1.

Figures 5, 6:
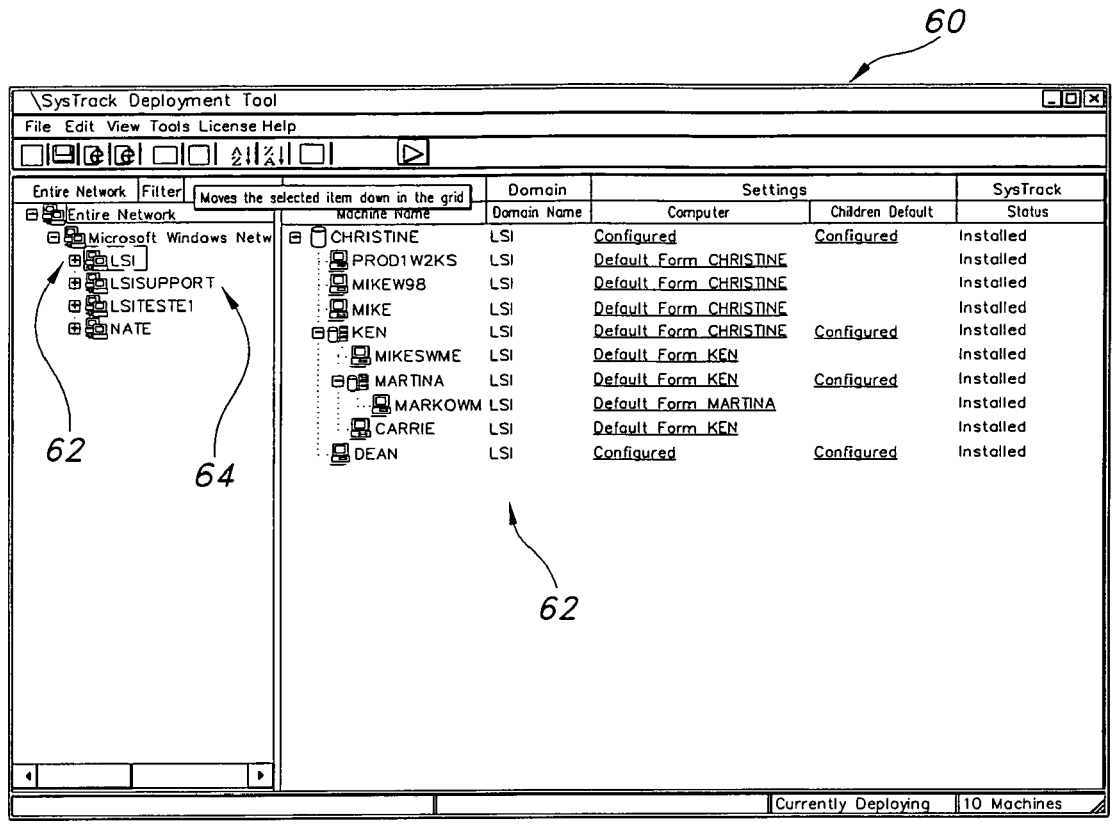
FIG. 5 is an exemplary screen display of a hierarchy of databases according to the invention.
FIG. 6 is a simplified block diagram view showing, in greater detail, the index table of FIG. 2 for a bottom-level (child) node in the hierarchy.

FIG. 5 shows a screen display 60 illustrating a sample deployment of a distributed network according to the present invention. Display 60 is shown having a left pane and a right pane providing details of selections made in the left pane. The left pane shows a distributed network having various domains, such as a first domain 62, labeled as domain "LSI", and a second domain 64, labeled as domain "LSI SUPPORT". The right pane shows, in greater detail, the hierarchical structure of the computers of domain LSI. The computer designated "CHRISTINE" is the top-level master node, and is considered the top or first level in the hierarchy.

At the second level, in display 60, there is shown five computers designated "PROD1W2KS", "MIKEW98", "MIKE", "KEN" and "DEAN". Of the computers at the second level, the computer designated "KEN" is acting in the role of a parent node, with the remainder of the computers acting in the role of a child node.

At the third level, in display 60, there is shown three computers designated "MIKESWME", "MARTINA" and "CARRIE". The computer designated "MARTINA" is acting in the role of a parent node, while the rest of the computers at the third level are acting in the role of a child node.

At the fourth level of the hierarchy, in display 60, there is one computer designated "MARKOWM", which is acting in the role of a child node.

FIG. 6 shows, in greater detail, an index table 65 for the computer designated "DEAN" in the display 60 of FIG. 5. Computer "DEAN" is a child node in the hierarchy. Index table 65 is contained in a database 18 associated with computer "DEAN." Were there any computers below computer "DEAN" in the tree, any index data passed upstream to computer "DEAN" from lower levels would also appear here (but is not applicable in this case). Index table 65 includes a record type field 66, one or more name fields, collectively referred to as name field 68, a plurality of fields, $L_1, L_2, L_3, \ldots L_n$ where n equals the depth of the tree, collectively referred to as fields 70, and a connection string field 72.

Record type field 66 contains data indicative of the type of record for index table 65. In a constructed embodiment, five record types are provided for, although only four record types are shown in FIG. 6 for computer "DEAN." Of course, more or less record types could be established and remain within the spirit and scope of the present invention.

A first record type (hereinafter Type "1") specifies information about the databases 18 contained within the subtree headed by the particular database 18 containing the subject index table itself. In this regard, fields 70 labeled $L_1, L_2, \ldots L_n$ are also included in each record, where each field $L_x$ names a level in the hierarchy of databases 18. The value n represents the depth of the subtree. The fields apply to all record types 1, 2, 3, 4 and 5. In the illustrated embodiment of FIG. 6, there is shown fields to support sixteen levels in the hierarchy. Field $L_1$ represents the top-most level in the subtree, which contains the name of the database 18 that contains this index table, field $L_2$ represents the name of the database at the next lower level, and so on. By examining these records (e.g., type "1" records), the console module 22 may be configured to reconstruct the complete hierarchy of the subtree of databases.

The second record type (hereinafter Type "2") specifies the name of a system whose original data is held in one of the databases 18 contained in the subtree. In the example of FIG. 6, there exists a "type 2" record. The "type 2" record specifies a computer system named "DEAN" (this is under field designated "NAME1"), which is a Windows NT-based system (under the field designated "NAME2"). The name of the computer system is thus found in field 68. The name of the database 18 that holds the data for that system is found in the plurality of fields 70 for this record type. It bears emphasizing that the level stated in the field names of fields 70 are not absolute, but rather are relative to the level at which the database 18 exists in the subtree. For example, as shown in FIG. 6, "DEAN" is shown as being at level 1, although clearly, as shown in FIG. 5, "DEAN" is at the second level in the overall hierarchy of databases (computer "CHRISTINE" being at the first level). Nonetheless, as to the index table 65 for computer "DEAN," "DEAN" will be named at level 1. These record types may be used by console module 22 to locate the databases 18 in the subtree to allow access and process a query. That is, the console 22 can connect to any index table in the tree and have access to full information regarding the subtree.

A third record type (hereinafter Type "3") specifies the name of a disk system whose original data is held in the databases 18 in the subtree. In FIG. 6, for example, the "Type 3 Record" shows a name of "67," which designates a C: drive in a system. Information regarding disk "67" on computer "DEAN" is found in the local database 18.

A fourth record type (hereinafter Type "4") specifies the name(s) of network interfaces whose data is held in the databases 18 in the subtree. In FIG. 6, a ("Type 4") record is shown, wherein the network interface is named "FE575 ETHERNET ADAPTER" in name field 68.

A fifth record type (hereinafter Type "5") specifies the names of users who, in one embodiment, have executed at least one application program on a system in the subtree. These record types are used to locate target databases 18 that need to be connected to, and accessed, in order to retrieve original data to answer queries about user activity. As shown in FIG. 6, there are two "Type 5" records. The first lists the user called "DEAN/SYSTEM", and the second is "LSI/dean". Note that on the computer system 12 named "DEAN" there are considered at least two users: One is the human user named "dean" logged into the domain "LSI", and the second user is the system itself, which, as well-known to those of ordinary skill in the art, is conventionally configured to run various application programs, system services, and the like.

With the continued reference to FIG. 6, the connection string field 72 is used by console module 22 in order to connect directly with the particular database 18 specified in the naming fields $L_1, L_2, \ldots L_{16}$. This connection string 72 is encrypted for security purposes, in a constructed embodiment. In an alternate embodiment, however, multiple connection strings may be associated with a record in order to allow for database replication or alternate ways to connect to the database.

FIG. 7 is an excerpt from an index table 73 associated with a top-level master node corresponding to the computer system named "CHRISTINE" in FIG. 5. The console module 22 associated with computer "CHRISTINE" makes an initial connection to the base database associated therewith (e.g., such as database $18_1$ associated with a top-level master node $12_1$ shown in FIG. 1). Console module 22 is configured to use the index data contained in Type 1 records, which are designated as records 74 in FIG. 7, to reconstruct the subtree of the distributed network 14 in a hierarchical fashion. This subtree may then be shown as screen display 60 of FIG. 5, for example. The Type 2, Type 3, and Type 4 record types are used to display the computer systems, disks, and network interfaces, respectively, in the hierarchy at the correct locations, (i.e., at correct levels, and in the correct branches).

The architecture of the index tables shown and described above provides an extremely efficient way for console module 22 to connect to a limited number of databases 18 in order to resolve user queries. That is, the index tables allows the collection of databases 18 to be queried as a whole from the user perspective via console 22, while minimizing the actual number of databases that must be queried thereby preserving efficiency.

Notwithstanding the foregoing, certain types of queries cannot practically be efficiently handled using the index mechanism above. More particularly, this situation occurs where a relatively high percentage of the databases (on large number of databases in absolute terms) in the subtree contain relevant data, and resolving the query would require connection to all of these databases. In a second aspect of the present invention, to resolve these queries, certain types of data are summarized from the lower levels and then sent, level-by-level, on up to the top most node of a given subtree. The summarization process may take varying forms, depending on the nature of the data being summarized, but may include mathematical averaging, determination of minimums and maximums values, and summation of values. The process involves aggregating the data from a large number of records at one level to form a single record (or a small number of records) to be passed on up to the next level.

Figure 8:
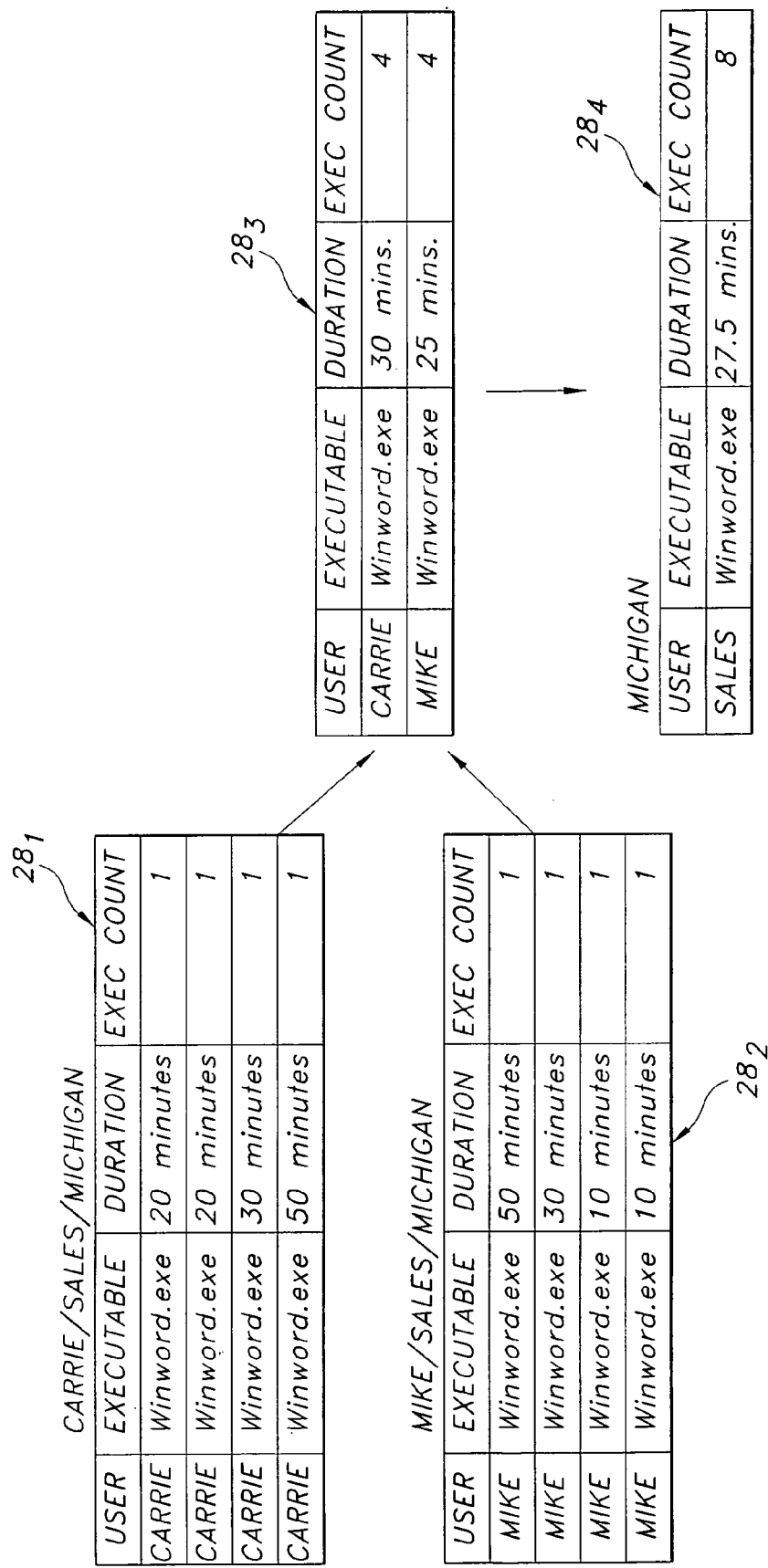
FIG. 8 shows, in greater detail, the summarized data table of FIG. 2, and a method of condensing data according to the invention.

FIG. 8 shows an example of one summarization process performed by condensing agent 20. The example involves application program usage data, although it should be understood that the summarization approach can be applied to a wide variety of data types. FIG. 8 shows a plurality of application tables $28_1$, $28_2$, $28_3$, and $28_4$ each including application program usage data. In addition, in the example to be described, it is assumed that a human user named "CARRIE", and a human user named "MIKE" both work in a sales department in a Michigan region (e.g., domain) of an organization. In FIG. 8, one record per domain/user/application combination is summarized, and aggregated up to the next level. As shown in application usage table 281, user "CARRIE/SALES/MICHIGAN" ran the executable WINWORD.EXE ("Microsoft WORD" word processor) four times. The application usage data for this combination is, as shown, averaged by condensing agent 20 and only one record for that executable will appear in the aggregated database $28_3$ that is one level up in the hierarchy of databases. Also note that the user MIKE/SALES/MICHIGAN, whose application table $28_2$ also contains four instances of WINWORD.EXE, is also aggregated and summarized to just one record in the application table that is one level up in the hierarchy. The information in table $28_3$ is therefore summarized data corresponding to the activity below it in the hierarchy. Note that the execution count (designated "EXEC COUNT" in the figures) reflects the total number of times that the application has been run.

Preferably, the information in table $28_3$ is sent up to the next level, maintaining one record per domain/user/application.

However, in an alternates embodiments, other attributes may be used during summarization, obtaining increased levels of condensation. For example, the data in the application table $28_3$ may be aggregated up one level to application table $28_4$, based on the attribute of being in "SALES". Note, that the duration parameter is further averaged, and reduced to a single record. Note the mathematical averaging of the duration of use of the application program as the condensing operation progresses through the different levels. Also note that the execution count in the application table $28_4$ reflects the total number of times (i.e., summation operation that all the users have run the application program. Condensing agent 20, of course, may also be configured to summarize other aspects of the application program usage, as well as other types of data as well.

Once console module 22 connects to a base database that contains application usage table $28_4$, it can answer certain user queries without having to drill down and connect to each monitored computer. This overcomes limitations in the art.

Another example of summarization involves an application resource requirement. For example, it is common in an enterprise for computers to use the same e-mail client (e.g., Microsoft OUTLOOK). Thus an administrator may wish to know the average memory utilization for OUTLOOK. This would require connection to nearly all of the computers 12 in the distributed network 14, even using the index approach of the present invention. However, using the summarization feature of the present invention, the requested information is summarized and is sent up, level-by-level, and is available to console 22. Thus, seemingly broad queries can be answered with a reduced amount of network connection and traffic.

Figure 9:
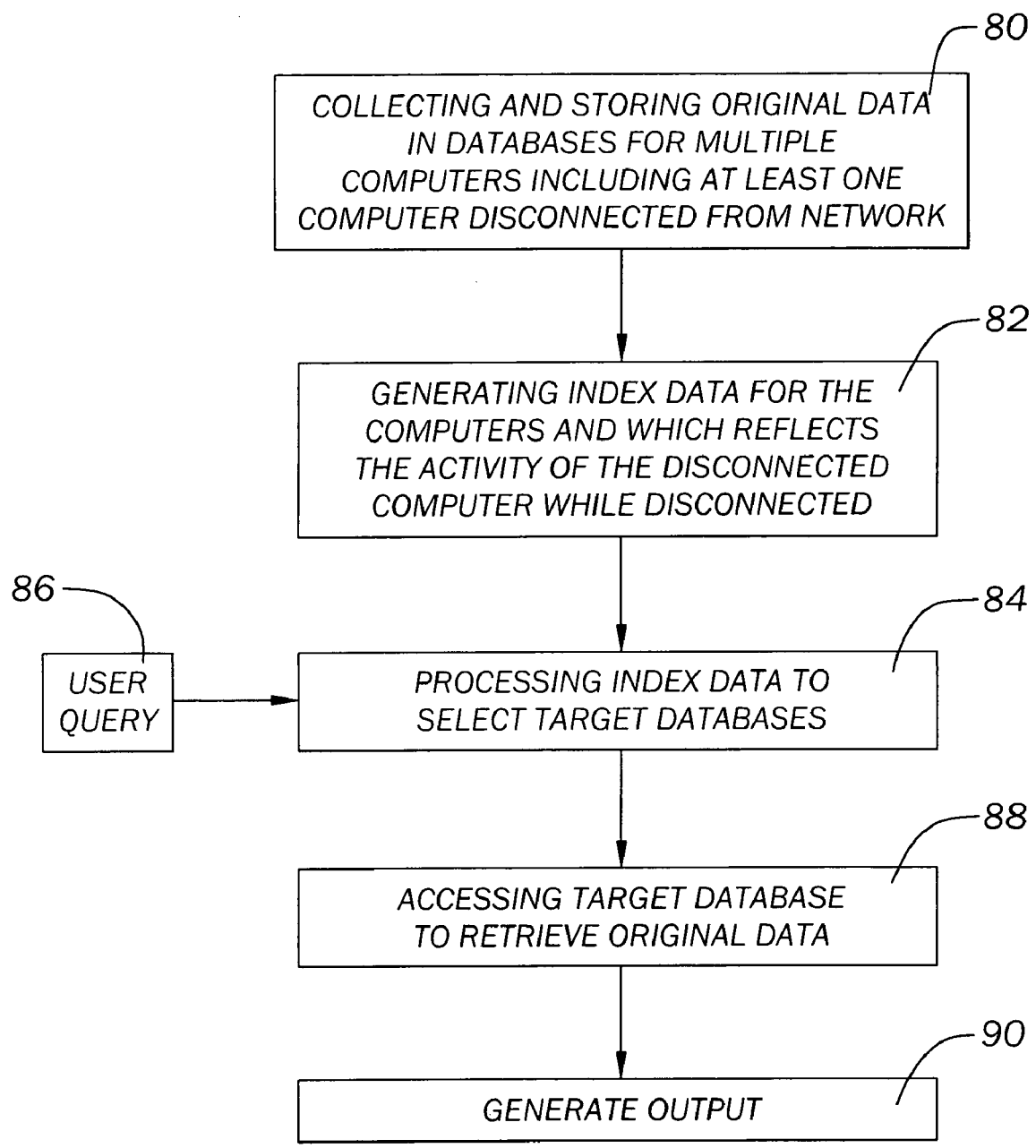
FIG. 9 is a flow chart diagram illustrating a method of collecting original data while a computer system is disconnected.

In another aspect of the present, apparatus 10 may be advantageously employed even though one or more of the monitored computer systems 12 is off-line or is disconnected, for example in a mobile workforce application. The basic architecture may be as illustrated and described in connection with FIGS. 1-8. Now with reference to FIG. 9, a flowchart is shown that provides a method suitable for off-line collection of information in accordance with the present invention. In step 80, apparatus 10 is configured for collecting original data (i.e., as described herein) for each computer while at least one of the computers is disconnected from the network and storing the original data in a respective collection database. As described above, the collection agent 16 associated with a computer 12 can be configured to stored original data so collected in a local database. Accordingly, even if the computer (e.g., laptop) were disconnected from the network, original data would continue to be collected, which in effect reflects the activity of the disconnected computer while it is disconnected from the network. The method then proceeds to step 82.

In step 82, the apparatus 10 is configured for generating an index table including index data as described elsewhere in this document. In a preferred embodiment, before the generating step is performed, the previously disconnected computer is reconnected to the network, wherein the condensing agent is operative to condense and forward condensed information, either index data or summarized data, upstream, as also described herein. Once this is done, the index table at any particular level reflects the activity of the computers below it in the hierarchy, including the activity of the previously disconnected computer while it was disconnected. The same holds true of any summarized data. The method then proceeds to step 84.

In step 84, apparatus 10 is configured for processing the index data referred to in step 82 in order to select target databases, all in the manner as previously described. In connection with this processing, such index data may be processed to identify which collection databases 18 contain original data responsive to a user query (designated as being input from block 86). It should be understood that to the extent the query can be answered by resort to the summarized data, apparatus 10 is so configured to simply access such summary data and generate an output (this variation is not shown in FIG. 9). The method otherwise proceeds to step 88 where access to the collection databases is required to answer the user query.

In step 88, apparatus 10 is configured for accessing the selected (target) databases in order to retrieve original data, as desired. The method proceeds to step 90.

In step 90, the retrieved original data from the collection databases is used by apparatus 10 to generate an output in a manner as described above.

Figure 10:
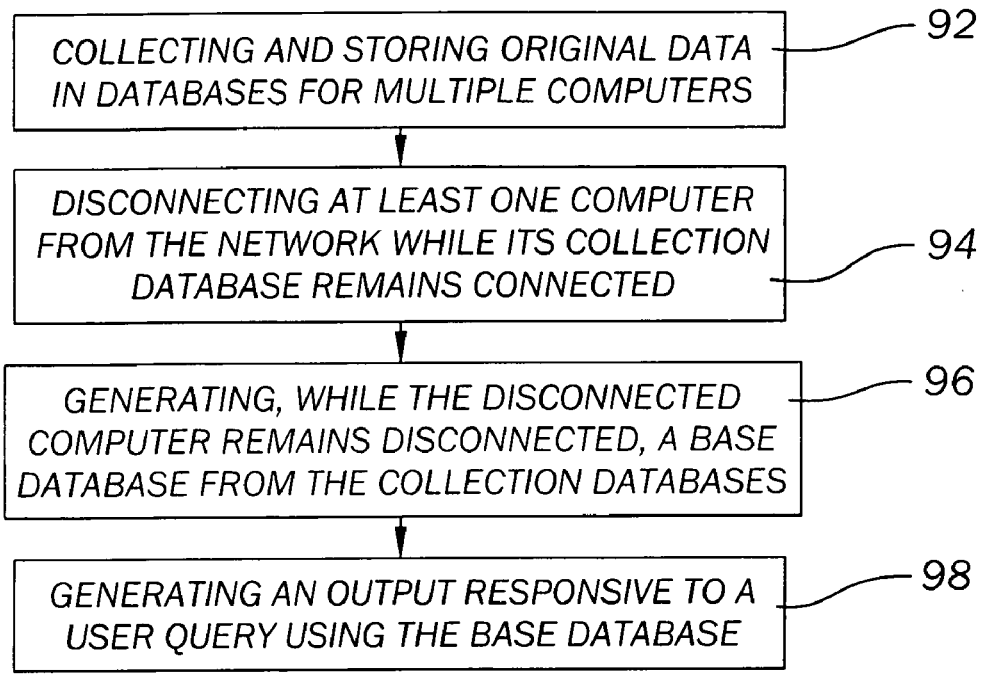
FIG. 10 is a flow chart diagram illustrating a method of processing condensed data derived from original data while a computer system is disconnected.

FIG. 10 is a flowchart showing a further variation that may be advantageously employed in networks servicing a mobile workforce (i.e., laptops) or where analysis is often done during off hours where network computers are off-line (off). The method begins in step 92 where apparatus 10 is configured for collecting original data for each computer and storing the original data in a respective collection database wherein at least one of the computers is remote from its respective, associated collection database. In a preferred embodiment, this is implemented by first establishing a client-server database arrangement between such computer and its respective collection database and then transferring original data from the at least one computer to it respective remote collection database. The method then proceeds to step 94.

Method step 94 involves the step of disconnecting the at least one computer from the network while its associated collection database 18 remains connected to the network and thus accessible by the apparatus 10 (console) for analysis. This method step may occur when a laptop is disconnected from the network for mobile workforce applications, or when simply when the computer is shut-off, for example, at the end of the workday or for the weekend. The method then proceeds to step 96.

In step 96, apparatus 10 is configured for generating a base database from the collection databases 18 while the disconnected computer in step 94 remains disconnected. As described above, the base database may include either an index table having index data (as described herein) or summary data (also as described herein). The method then proceeds to step 98.

In step 98, the apparatus 10 is configured for generating an output responsive to a user query using the base database, all as described above. For example, this may involve scanning the index tables for selecting collection databases for further access and retrieval of original data (if needed to answer the query), or in the alternative, to directly access the summary data if that would be sufficient to answer the user query.

Figure 11:
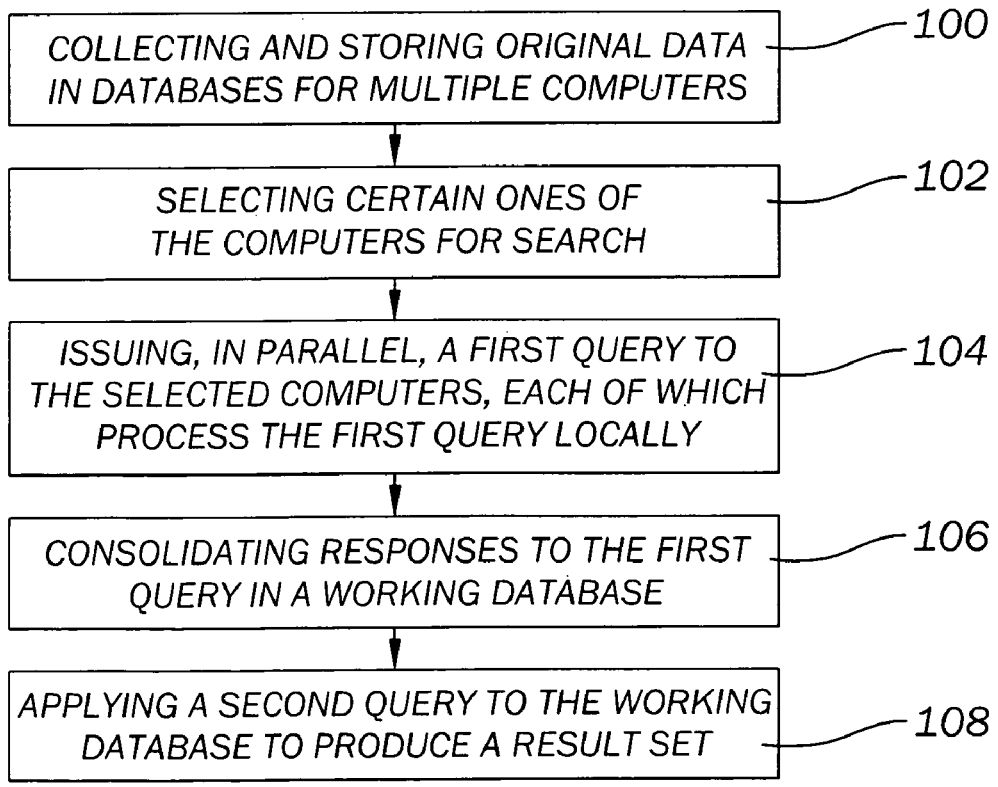
FIG. 11 is a flow chart diagram illustrating a method of distributed processing to achieve near optimal query performance.

FIG. 11 shows yet another method in accordance with the present invention that provides for optimized, distributed processing as well as providing excellent scalability. The method begins with step 100 involving collecting and storing original data associated with a plurality of computers in respective collection databases, all as already described in detail herein. The method then proceeds to step 102.

Step 102 involves selecting certain ones of the plurality of computer systems for search. This step can be characterized as a search space constraining step, which may result in having to query less than all of the collection databases. In this regard, however, in one embodiment, the default is to select all of the computer systems 12 for search. In another embodiment, however, the identity of the computer systems 12 desired for search is provided by an external source, either another computer or a user. In still another embodiment, apparatus 10 is configured to accept data or other search-space constraining information and either scan the index tables, as described above, or check the summary data, as also described above, to identify which computer systems 12 will likely have original data that can be used to answer a query. An detailed will be given below. The method proceeds to step 104.

In step 104, the apparatus 10 (console) is configured for issuing, in a substantially parallel fashion, a first query to the selected computer systems (step 102) each of which process the first query locally with respect to original data contained in their respective collection databases. This step may be characterized as a table or working database building query. The method then proceeds to step 106.

In step 106, the apparatus 10 (console) is configured for consolidating responses to the first query (which may possibly be empty or non-empty) in a working (or temporary) database at a base location that is remote from the plurality of collection databases. Other embodiments of the apparatus may store responses from the first query in storage other than a database while still remaining within the scope of this invention. It should be appreciated that this aspect of the invention harnesses the computing power of the many distributed computer systems forming the distributed network to concurrently work on a complex query and that network traffic is also minimized (i.e., compared to the alternative which is to forward all the original data over the network to a central location and conduct the query there). The method then proceeds to step 108.

In step 108, the apparatus 10 is configured for applying a second query to the working database to produce a result set. The result set may then be subject to still further processing, perhaps in connection with still further data, to form a report, which can be formatted and displayed to the user.

The method illustrated and described in connection with FIG. 11 may be employed to answer any number of complex queries with near optimal query performance while also exhibiting excellent scalability. Example queries may be determining the top 50 computer systems based on average CPU utilization and also having a particular kind of hard drive, or identifying those computer systems having particular applications (software inventory) and with a CPU utilization greater than 20%. The variations are limitless, and examples described herein are exemplary only and not limiting in nature.

Example. Consider a scenario where the enterprise includes a thousand (1000) computer systems networked in some fashion, and where the complex query to be answered is "What are the top 10 computer systems by "% Disk Busy Time" during periods in which CPU usage was at least 50%?

In a centralized database approach characteristic of the prior art, the database would be very large. The query would be quite slow, and network bandwidth usage would be excessive just to get the raw data to the central database.

The present invention maintains most of the raw data (original data) close to the collection point, which is typically a local collection database to minimize the network traffic cost of collecting and maintaining the data, while at the same time keeping each database to a reasonable size.

In a brute force implementation, one might collect all of the records containing "% Disk Busy Time" data band CPU usage data to a central location, and then query the results from the centralized data. This would be network inefficient and still would result in a query against a large database.

In the present invention, a query may be sent to each system to calculate the "% Disk Busy Time" on records for which CPU usage was at least 50%. Each of the 1000 computer systems in our example executes this query locally, and returns the calculated average as the result of the query.

Once all the results/responses are received and consolidated into a top-level working or temporary database table, the working database is then queried to retrieve the top 10 systems by average "% Disk Busy Time" (already filtered for CPU usage by the responding computer systems (or agents executing thereon fulfilling the issued query). The top-level apparatus 10 then formats and displays the results to the user.

This aspect of the present invention provides highly optimal query performance while simultaneously optimizing network traffic.

It should be understood that the foregoing is exemplary only, and not limiting in nature. As described above, there exists a variety of information that may be summarized, either through averaging, maintaining of the minimum or maximum values, weighted averaging, or the like. The feature is that as data is summarized from one level to the next level upstream, the number of records is reduced, to maintain a manageable number of records across the distributed network. Through the foregoing, console module 22 is able to answer user queries extremely efficiently, without having to connect to a large number of databases.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof. For example, while the system 10 of the present invention has been described as presenting a user interface that provides no indication that the collection of databases are being accessed via dual mode operation (i.e., the index mode and the summary mode), such need not be the case. In an alternate embodiment, the mode of operation is user selectable. The console may be further configured to present preliminary information that the user may use to aid in his selection (e.g., the number of databases that would be accessed via the index mode of operation to answer the query). In a still further alternate embodiment, the mode of operation may be switch between the index method and the summary method at a predetermined crossover (e.g., the number of database that would have to be accessed). Alternate embodiments may use storage means other than a database.

What is claimed is:

1. A method of managing information for a plurality of computers in a distributed network comprising the steps of:
   (A) collecting original data for each computer relating to at least one of a system, an application program and a user associated with said respective computer and storing the original data in a respective database;
   (B) generating an index table including index data for each computer wherein the index data is configured (i) to identify at least a portion of the contents of the original data stored in the database, and (ii) to facilitate access to the databases over the distributed network;
   (C) selecting at least one of the plurality of databases by scanning index tables and determining, using the index data, which of the databases contain original data responsive to a user query;
   (D) accessing the selected databases to retrieve original data and generate an output therefrom.

2. The method of claim 1 wherein said step of generating an index table is performed at least at a first location of a first one of said computers, said steps of selecting and accessing being performed at a second location different from said first location to thereby provide distributed processing.

3. An apparatus for managing information for computers in a distributed network comprising:
   a memory;
   a collection agent associated with each of a plurality of computers configured to acquire and store original data related to a respective computer in a respective storage database, said computers arranged in a logical tree style hierarchy;
   at least one condensing agent for condensing said original data into index data, said index data configured (i) to identify at least a portion of the contents of said original data, and (ii) to facilitate access to said storage databases over the distributed network, said index data including fields corresponding to a position in said hierarchy;
   a base database, embodied in the memory, including said index data;
   a console module configured to select storage databases for access thereto responsive to a user query for said contents, said console being further configured to use said index data to access said selected storage databases, retrieve original data, and generate an output.

4. The apparatus of claim 3 wherein said console module is configured to execute on a head end of said hierarchy, a remainder of said computers populating a subtree of said hierarchy at a plurality of levels.

5. The apparatus of claim 4 wherein said original data in said storage databases comprises information relating to at least one of systems, disks, networks, application programs, and users associated with a respective one of said plurality of computers.

6. An apparatus for managing information for computers in a distributed network comprising:
   a memory;
   a first database configured to store original data related to a first computer, said original data corresponding to at least one of operational and configuration characteristics of hardware, software and user of said computers;
   a condensing agent coupled to said first database and configured to generate summarized data based on said original data;
   a base database, embodied in the memory, having a first portion configured to store said summarized data and a second portion configured to store index data comprising at least connection information of said first database; and a console module coupled to said base database and configured for operation in (i) a first mode to generate a first output based on said summarized data and (ii) a second mode wherein said console module uses said connection information in said index data to facilitate access to said first database to generate a second output.

7. The apparatus of claim 6 further comprising a data collection agent for acquiring and storing said original data in said first database.

8. The apparatus of claim 7 wherein said first database is local to said first computer.

9. The apparatus of claim 7 wherein said first database is remote from said first computer, said first database comprising a portion of a client-server database.

10. The apparatus of claim 6 wherein said data collection agent is configured to acquire said original data relating to at least one of a system, a disk, a network interface, an application program and a user associated with said first computer.

11. The apparatus of claim 6 wherein said first portion of said base database comprises an application table having information relating to usage of application programs.

12. The apparatus of claim 11 wherein said summarized data comprises statistical information relating to said usage of application programs.

13. The apparatus of claim 11 wherein said application table, for each user executing an application program on said first computer, includes a respective record containing summarized data indicative of such application program usage.

14. An apparatus for managing information for computers in a distributed network comprising:
a memory;
a first database configured to store original data related to a first computer, said original data corresponding to at least one of operational and configuration characteristics of hardware, software and user of said computers;
a condensing agent coupled to said first database and configured to generate summarized data based on said original data;
a base database, embodied in the memory, having a first portion configured to store said summarized data and a second portion configured to store index data comprising at least connection information of said first database, wherein said first portion of said base database comprises an application table having information relating to usage of application programs; and
a console module coupled to said base database and configured for operation in (i) a first mode to generate a first output based on said summarized data and (ii) a second mode wherein said console module uses said connection information in said index data to facilitate access to said first database to generate a second output, wherein a plurality of application programs are executed on said first computer by a user, said application table comprising a corresponding plurality of records, one for each application program and system combination, each record having summarized data comprising statistical information regarding such use of said application programs.

15. The apparatus of claim 11 further including a plurality of computers arranged in a tree style hierarchy, wherein application tables included in databases associated with each computer in said hierarchy are condensed and transmitted, level-by-level, to databases upstream in said hierarchy.

16. A method of managing information for a plurality of computers configured for connection to a network, comprising the steps of:
(A) collecting original data for each computer associated with said respective computer, while at least one of said computers is disconnected from said network, and storing the original data in a respective database;
(B) generating for each computer an index table including index data configured (i) to identify at least a portion of the contents of the original data stored in the database, and (ii) to facilitate access to the databases over the distributed network and wherein said index data reflects the at least one disconnected computer when reconnected to said network;
(C) selecting at least one of the plurality of databases by scanning index tables and determining, using the index data, which of the databases contain original data responsive to a user query;
(D) accessing the selected databases to retrieve original data and generate an output therefrom.

17. The method of claim 16 further including the step of:
before the generating step, reconnecting said at least one disconnected computer to the network.

18. A method of managing information for a plurality of computers configured for connection to a network, comprising the steps of:
(A) collecting original data for each computer associated with said respective computer, and storing the original data in a respective collection database wherein at least one of the computers is remote from a respective one of said collection databases;
(B) disconnecting the at least one computer from the network while the remote, respective one of said databases remains connected to the network;
(C) generating, while the at least one computer is disconnected, a base database from said collection databases containing condensed data wherein the condensed data reflects one of an index table including index data or summarized data, the index data being configured (i) to identify at least a portion of the contents of the original data stored in the database, and (ii) to facilitate access to the databases over the distributed network;
(D) generating an output responsive to a user query using the base database.

19. The method of claim 18 further including the step of:
selecting at least one of the plurality of collection databases by scanning index tables and determining, using the index data, which of the collection databases contain original data responsive to the user query; and
accessing the selected collection databases to retrieve original data.

20. The method of claim 18 wherein the collecting step is performed by the substeps of:
establishing a client-server connection between the at least one computer and the respective, remote one of said collection databases; and
transferring original data from the at least one computer to the respective, remote one of said collection databases.

21. A method of managing information for a plurality of computer systems in a distributed network comprising the steps of:
(A) collecting original data associated with each computer system and storing the original data in a respective collection database associated therewith ;
(B) selecting certain ones of the plurality of computer systems for search;

(C) issuing a first query to the selected computer systems each of which process the first query locally with respect to original data contained in the respective collection database;

(D) consolidating responses to the first query in a working database at a base location remote from the plurality of collection databases;

(E) applying a second query to the working database at the base location to produce a result set;

(F) generating an output using the result set.

22. The method of claim 21 wherein said selecting step is performed by the substep of:

receiving an identification of the selected computer systems for search from an external source.

23. The method of claim 21 wherein the step of issuing a first query is performed in a substantially parallel fashion to the selected computer systems.

24. The method of claim 21 wherein said selecting step is performed by the substep of:

identifying all of the plurality of computer systems as selected computer systems for search.

25. The method of claim 21 wherein said selecting step is performed by the substeps of:

generating an index table including index data for each computer system wherein the index data is configured (i) to identify at least a portion of the contents of the original data stored in the collection database, and (ii) to facilitate access to the collection databases over the distributed network;

conducting a search space constraining query by scanning the index tables and identifying, using the index data, as the selected databases for search those collection databases that contain original data responsive to the search space constraining query.

26. The method of claim 21 wherein said selecting step is performed by the substeps of:

producing a summarized data table for the computer systems using the original data;

conducting a search space constraining query by scanning the summarized data table and identifying as the selected databases for search those collection databases that contain original data responsive to the search space constraining query.

27. The method of claim 21 wherein the step of applying a second query to the working database includes the substep of:

utilizing supplemental data external to the working database.

28. The method of claim 21 wherein the step of generating an output includes the substeps of:

formatting and displaying the output.

29. A method of managing information for at least one of systems, disks, networks, computer programs and users in a computer network, comprising the steps of:

(A) collecting original data comprising at least one of operational or configuration characteristics of systems, disks, networks, computer programs and users of one or more computers and storing the collected original data in a respective storage mechanism;

(B) constructing an index having items configured to identify at least a portion of the original data and associating the items in the index with the storage mechanisms that contain the at least portion of original data;

(C) identifying, using the constructed index, which of the storage mechanisms contain original data responsive to a user query; and (D) accessing the identified storage mechanisms to retrieve at least a portion of the original data and generate an output therefrom.

30. A method of managing information for at least one of systems, disks, networks, computer programs and users in a computer network, comprising the steps of:

(A) establishing a respective original data storage mechanism comprising at least one of operational or configuration characteristics of systems, disks, networks, computer programs and users of one or more computers;

(B) constructing an index having items configured to identify at least a portion of the contents of the original data and associating the items in the index with the storage mechanisms that contain the at least portion of original data;

(C) identifying, using the constructed index, which of the storage mechanisms contain original data responsive to a user query; and (D) accessing the identified storage mechanisms to retrieve at least a portion of the original data and generate an output therefrom.

31. A method of managing information for at least one of systems, disks, networks, computer programs and users in a computer network, comprising the steps of:

(A) collecting original data comprising at least one of operational or configuration characteristics of systems, disks, networks, computer programs and users of one or more computers and storing the collected data in a respective one of first storage mechanisms;

(B) constructing an index having items configured to identify at least a portion of the original data and associating the items in the index with the first storage mechanisms that contain the at least portions of original data;

(C) summarizing at least a portion of the original data in accordance with a mathematical function to produce summarized data and storing the summarized data in a second storage mechanism different from the first storage mechanism; and (D) producing a response to a user query by one of (i) identifying, using the constructed index, which of the first storage mechanisms contain original data responsive to the user query, and accessing the identified first storage mechanisms to retrieve at least a portion of the original data; and (ii) querying the second storage mechanism in accordance with terms of the user query to retrieve responsive summarized data.

\* \* \* \* \*